G. A. DEARDORFF.
ROAD INDICATOR.
APPLICATION FILED MAY 25, 1916.

1,250,811.

Patented Dec. 18, 1917.
3 SHEETS—SHEET 1.

Inventor
George A. Deardorff.

By
[signature], Attorney.

G. A. DEARDORFF.
ROAD INDICATOR.
APPLICATION FILED MAY 25, 1916.
1,250,811.
Patented Dec. 18, 1917.
3 SHEETS—SHEET 2.
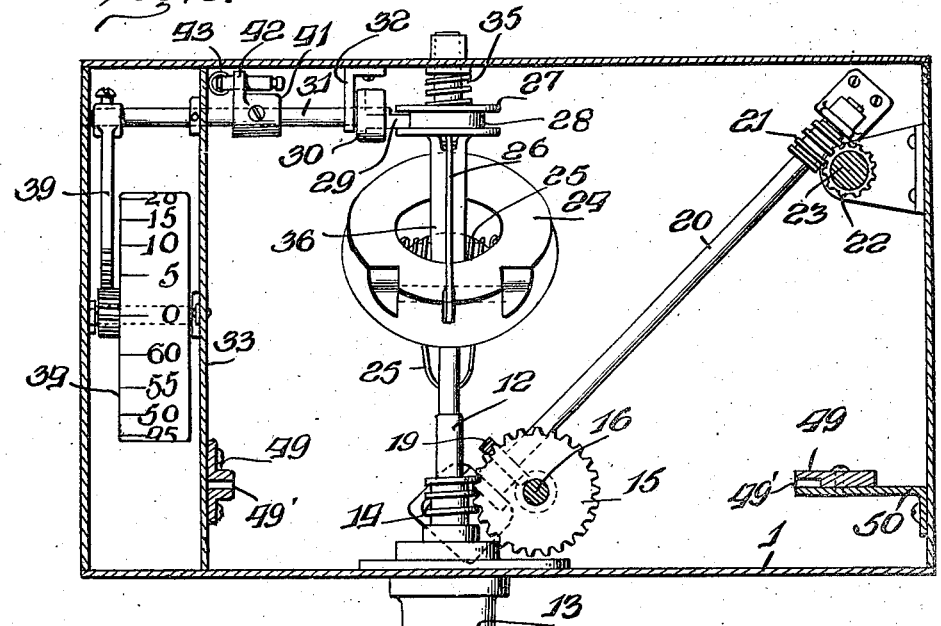
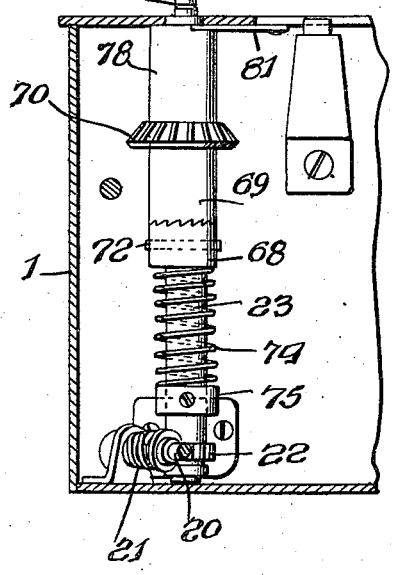
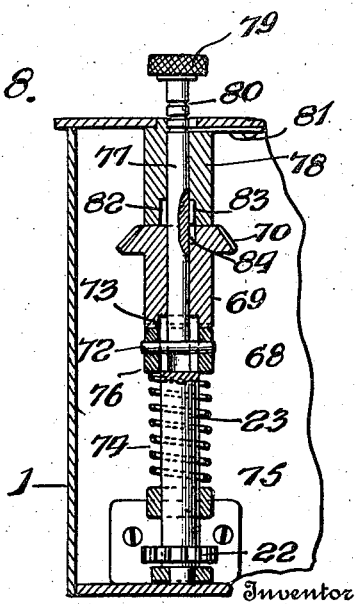
Inventor
George A. Deardorff.
By [signature], Attorneys

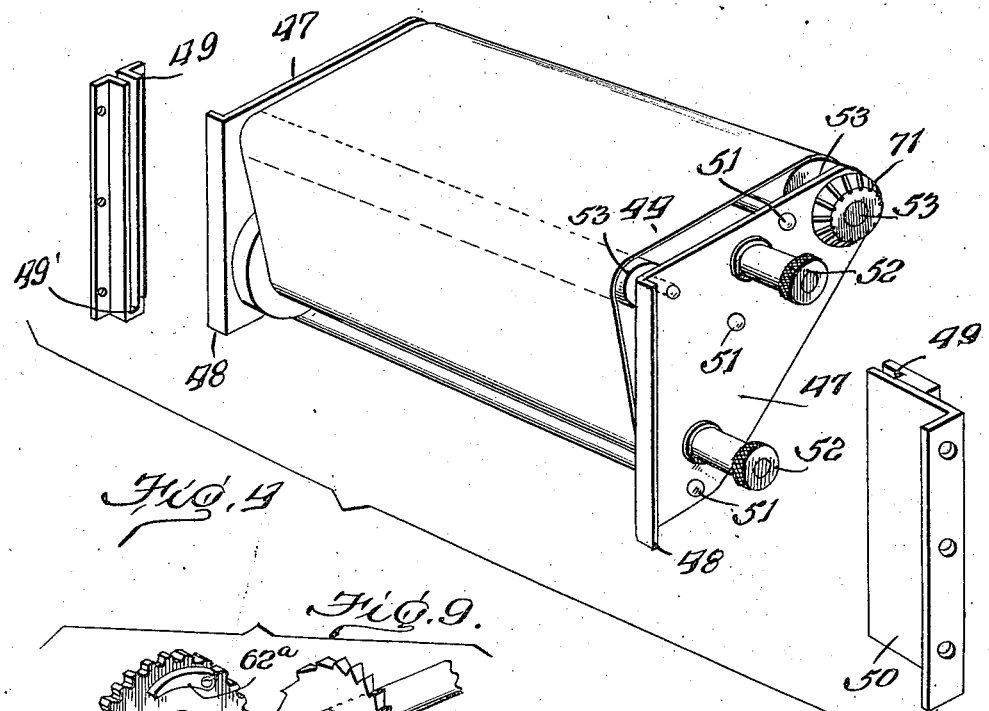
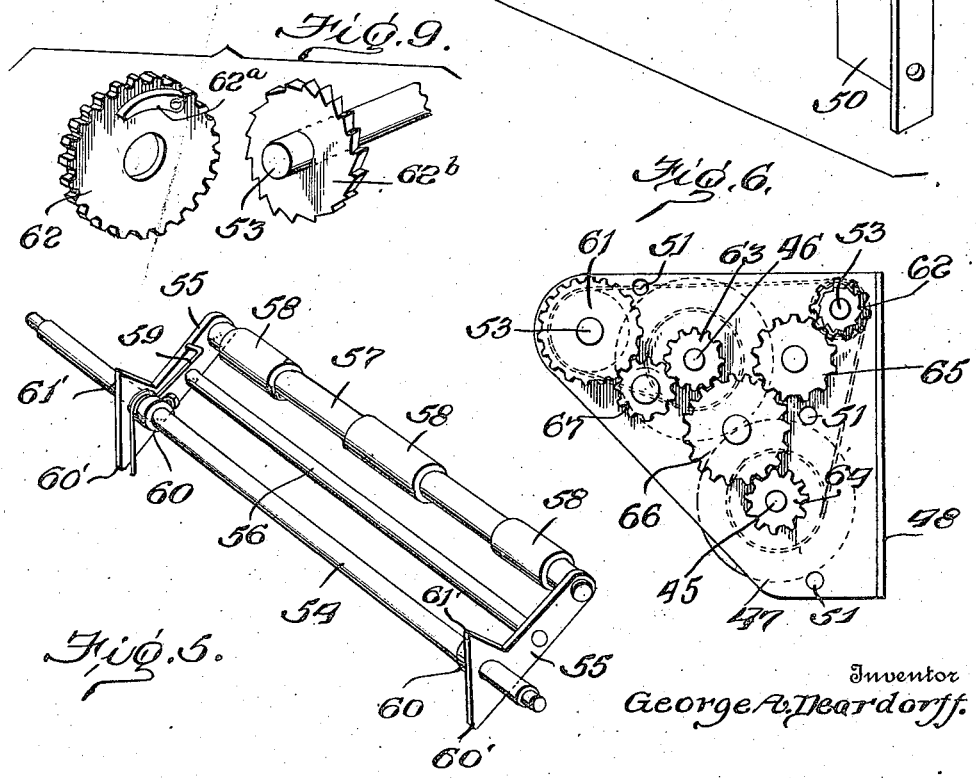

UNITED STATES PATENT OFFICE.

GEORGE A. DEARDORFF, OF OCCOQUAN, VIRGINIA.

ROAD-INDICATOR.

1,250,811.           Specification of Letters Patent.     Patented Dec. 18, 1917.

Application filed May 25, 1916. Serial No. 99,876.

*To all whom it may concern:*

Be it known that I, GEORGE A. DEARDORFF, a citizen of the United States, residing at Occoquan, in the county of Prince William and State of Virginia, have invented certain new and useful Improvements in Road-Indicators, of which the following is a specification.

This invention relates to road indicators for use upon automobiles or other moving vehicles, and has for its object the provision of a compactly arranged device whereby the traveler will be informed of the route over which he must pass to reach a given point and also informed as to the speed at which he is traveling as well as the mileage over which he has traveled. A further object of the invention is to provide means whereby the web or route indicator will be maintained in a proper taut condition at all times and will be positively actuated at a speed proportioned to the speed at which the vehicle is traveling. A further object of the invention is to provide a support or carrier for the web which may be easily removed from or inserted in the casing so that any desired map may be readily arranged for use or substituted for a previously used map. A still further object of the invention is to provide means whereby the map may be easily reset without being removed from the casing and also whereby tampering with the map or other mechanism will be guarded against when the vehicle is left unoccupied. A further object of the invention is to provide a novel operating mechanism whereby the road indicator, the odometer and speedometer will be simultaneously actuated. Other incidental objects of the invention will appear as the description of the same proceeds.

The invention is illustrated in the accompanying drawings, in which:

Fig. 3 is a horizontal section with the road indicator and its support removed, the section being taken on a plane below the road indicator;

Fig. 4 is a detail perspective view of the road indicator and its carrier frame, together with the guides which are engaged by the frame when it is being inserted in the casing;

Fig. 5 is a detail perspective view of one of the tension devices for the road indicator;

Fig. 6 is an end view of the road indicator, showing the end opposite that appearing in Fig. 4;

Figs. 7 and 8 are respectively a side elevation and a vertical section of the resetting device;

Fig. 9 is a detail of one of the gears.

Figure 1:
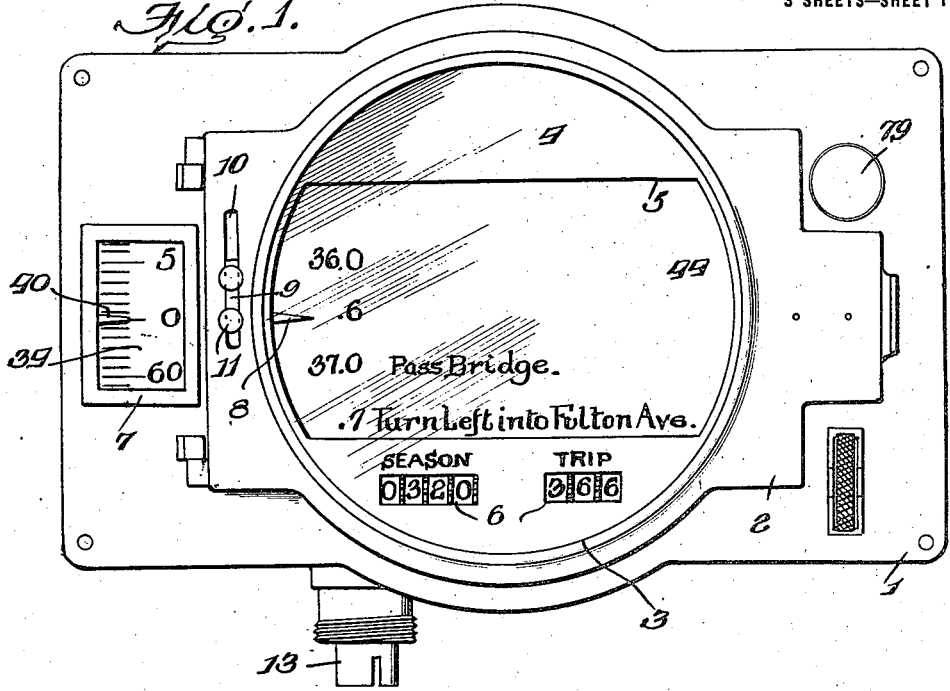
Figure 1 is a plan view of an apparatus embodying my present improvements.

The several parts of the apparatus are housed within a casing 1 which may be secured to the dash-board of the vehicle in any convenient or preferred manner so that it may be readily viewed by the operator. The casing is provided with a large opening through its top which opening is normally covered by a door 2 hinged upon the top plate of the casing and having a large central circular glazed rim or opening, indicated at 3. To the under side of this door, I secure a plate 4 having a central opening or slot 5 through which the road indicator may be read and also provided with smaller slots 6 through which the odometer may be read, as will be readily understood on reference to Fig. 1. In the top plate of the casing, at one end thereof, I provide an opening 7 through which the speedometer may be read. A pointer or indicator finger 8 is carried by the door 2 and this finger may be fixed to the inner or under side of the door or it may be provided with a slide 9 playing in a slot 10 in the door and adjusted by the manipulation of a knob or handle 11 so that the pointer may be accurately adjusted at the beginning of a trip to register with the zero point on the road map. It is also possible, by this construction, to set the finger so that the reading of the map may be at a higher or lower point of the sight opening according to the preference of the user of the car. A flexible shaft of the usual type is mounted upon the vehicle and suitably geared to one of the ground wheels so that the rotation of said wheel will be imparted to the shaft and transmitted thereby to the main driving shaft 12 which is journaled in the front and rear walls of the casing and equipped with a coupling 13 to be connected to the said flexible shaft in the usual manner. The main driving shaft 12 is provided with a worm 14, near the rear side of the casing, and this worm meshes with a gear 15 on a vertical shaft 16 which is journaled in suitable brackets 17 secured to the said rear side of the casing. The shaft 16 is operatively connected through suitable gearing at its upper end with the odometer, which may be of any well-known type. Below the lower bracket 17 a worm 18 is fitted upon the vertical shaft 16 and this worm meshes with a pinion 19 on the rear end of a shaft 20 which extends obliquely to a forward corner of the casing where it is equipped with a worm 21 meshing with a pinion 22 on the lower end of a shaft 23 disposed vertically within the casing and journaled in suitable brackets, as will be readily understood.

Upon the main shaft 12, intermediate the front and rear ends of the same, I mount a governor 24 which consists of a substantial ring or annular member encircling the shaft and pivoted to the same. A spring 25 is connected with the pivot of the governor and engages the shaft so as to normally hold the ring toward a position approaching parallelism with the axis of the shaft but permitting the ring to assume a position radial to the shaft under excessive speed. The ring is connected by a link 26 with a collar 27 slidably mounted upon the shaft and constructed with an annular groove 28 which is engaged by a pin 29 on the lower end of an arm 30 secured to the end of a shaft 31 which is journaled in suitable bearings upon the front wall of the casing, one of the bearings being in a bracket 32 and the other bearing being conveniently provided by a partition 33 which extends across the casing near one end of the same and serves to define a compartment in which the speedometer 34 is mounted. A spring 35 is coiled around the front end of the main shaft 12 and bears against the collar 27 so as to normally hold said collar toward the rear side of the casing. As the speed of the shaft 12 increases, the governor will move toward a radial position and will thereby push upon the link 26 so as to slide the collar 27 forwardly upon the shaft, and to steady the movement of the collar, I preferably provide it with an extended hub or sleeve 36 which fits around the shaft 12 and is provided with a slot 37 at its rear end to pass the pivot pin 38 on which the governor is hung. The forward movement of the collar 27 will, of course, rock the arm 30 and the shaft 31 to which said arm is secured, and this movement will be transmitted to a lever or crank arm 39 at the opposite end of said shaft which is geared directly to the speedometer so that the speedometer wheel or scale will be moved in synchronism with the main shaft and the numeral or other indicia denoting the speed at which the vehicle is traveling will be disposed opposite the pointer 40 carried by the top of the casing directly over the speedometer. It sometimes happens, when the machine is stopped, that the spring 35 will not be fully expanded and the speedometer will, consequently, not return to the zero point. To avoid this condition, I secure to the shaft 31 a collar 41 having a finger 42 thereon and to the said finger I attach a spring 43 which is placed under tension when the speedometer is actuated so that, immediately upon the stoppage of the vehicle, the said spring 43 will act, with the return of the governor to normally inactive position, to bring the speedometer back to the zero point.

Figure 2:
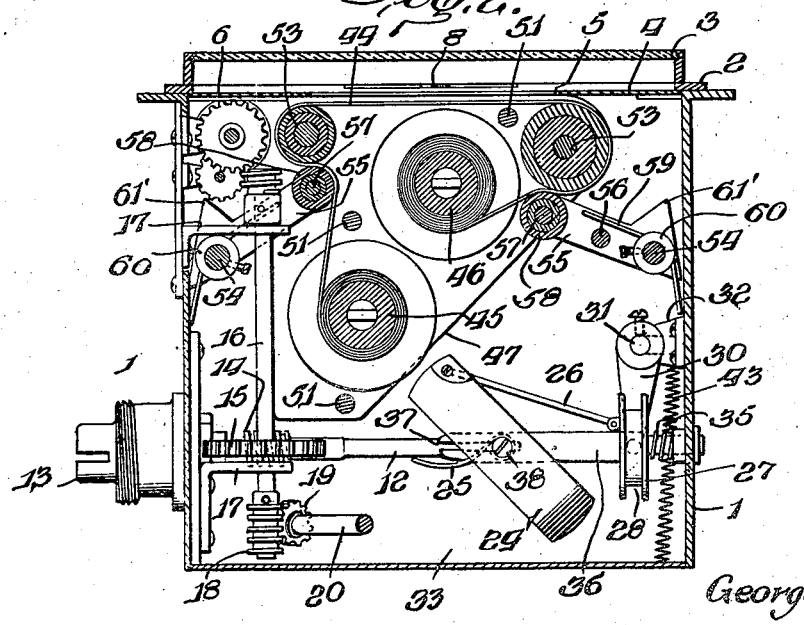
Fig. 2 is a transverse vertical section.

The road indicator is preferably in the form of a flexible web or band 44 having printed or otherwise displayed thereon the names of the stations which will be passed on the road between two given points, as well as a tabulated statement of the distance between the points and such other information as may be useful in directing a traveler to his destination. The mileage will preferably be arranged at that edge of the web which passes immediately under the indicator or pointer 8 and the names of the different stations or objects of interest will be displayed immediately adjacent the numerals indicating the mileage so that the pointer 8 will always be directing attention to the point at which the vehicle happens to be. The web is carried by two drums or rollers 45 and 46 and is wound upon one of said drums or rollers as it is unwound from the other. These rollers are supported by and between side plates 47 which are provided at their rear vertical edges with ribs or flanges 48 adapted to engage the guides 49 which are provided adjacent the front wall of the casing, as clearly shown. One of these guides will be conveniently furnished by angle irons or cleats secured to the partition 33 in parallel relation, while the other guide may be readily furnished by a grooved or recessed strip secured upon a bracket 50 projecting inwardly from one end wall of the casing. Stops 49' are provided at suitable points of the guide to limit the downward movement of the plates 47 and furnish positive supports for the same. The exact form of the positive supports or rests is immaterial and they may be located and formed in such manner as convenience and experience may suggest, the cover 2, when closed, bearing upon the upper edges of the plates 49 and holding them firmly on the stops. Suitable connecting rods 51 may be provided at convenient points to extend between the side plates 47 and have their ends brazed or otherwise permanently fastened to said side plates so as to impart rigidity to the frame and prevent spreading of the same. The drums or rollers 45 and 46 are removable so as to permit the maps or webs to be changed at will and to effect such removal, the ends of the rollers or drums are supported upon stub shafts or spindles journaled in the side plates and removably engaging sockets in the ends of the roller or drums. The spindles at one end will preferably be provided with milled nuts or heads 52 so that the web may be adjusted manually when being placed in position, and the spindles will preferably have a slip connection with the respective drums or rollers in order to accommodate the relative variation in speed of the rollers as the web winds upon or unwinds from the same. The web is thus prevented from flexing extensively between the drums and thereby causing inaccuracy in the readings. When the frame carrying the web is in position within the casing, an intermediate portion of the web will be disposed close to the sight opening or slot 5, as shown clearly in Fig. 2, and this intermediate portion of the web is supported by guide rollers 53 which are journaled in the side plates 47 at the upper front and rear corners of the same. In order that all the parts may be accommodated and space economized, the rear roller 53 may be relatively small in diameter but the radius of the front roller 53 must have a fixed relation to the spacing of the mileage indications on the web in order that the mileage actually traveled will be accurately shown by the web. Tension devices are provided within the casing to engage the web and one of these devices is illustrated in detail in Fig. 5, the two devices being duplicates so that a description of one will suffice for both and it being understood that one device is disposed at the front of the casing and the other device at the rear thereof, as clearly shown in Fig. 2. A rod 54 is supported in any convenient manner within the casing adjacent the wall of the same, and upon this rod I pivotally mount the supporting arms 55 which extend upwardly and inwardly from the rod. These arms may be connected by a bar or rod 56 so as to be permanently held in their spaced relation and in the outer ends of the same, I mount a roller 57 having friction sleeves 58 thereon. These sleeves 58 will preferably be of rubber or some other friction-creating material and may be provided in sections, as illustrated, or may be one continuous sleeve coextensive with the roller 57. Springs 59 are coiled about the rods 54, or stop collars 60 thereon, and one end of each spring bears against the adjacent wall of the casing while the opposite end thereof is secured to the adjacent arm so that the springs tend to hold the arms in an upwardly inclined position, as shown in Fig. 2. To limit the downward movement of the inner or upper ends of the arms 55, I extend the lower edges of the arms beyond the rod 54 so that the corners 60' will bear against the wall of the casing and to limit the upward movement of the arms so that the rollers 57 cannot be carried to such a point that they will not properly engage the web, I provide extensions 61' which, by impinging against the adjacent wall of the casing, will limit the upward movement of the arms. All these parts are so proportioned that, when the carrier consisting of the plates 47 and the rods connecting the same, is inserted in the casing by causing the ribs 48 to slide downwardly within the guides 49, the rollers 57 with the sleeves 58 thereon will engage the portions of the web between the drums 45 and 46 and the respectively adjacent guide rollers 53 and will hold said portions of the web against the guide roller. The downward movement of the said carrier frame will thus be arrested without a sudden shock being imparted thereto and the web will be supported and held against the guide rollers under constant tension, as clearly shown in Fig. 2, so that the intermediate or displayed portion of the web will remain taut and smooth under all conditions. It will also be readily noted that the increase in diameter of the wound web and the decrease in diameter of the unwinding portion of the web will be readily accommodated by these tension devices so that the shifting angular position of the web immediately adjacent the drums will not cause a disengagement of the webs from the guide rollers.

The several rollers 45, 46 and 53 are equipped at one end with gear wheels or pinions, as shown in Fig. 6, in which 61 designates the gear wheel or pinion on the end of the forward guide roller 53 and 62 designates the pinion on the end of the rear guide roller. 63 designates the pinion on the end of the drum 46 while 64 designates the pinion on the end of the drum 45, suitable idlers 65, 66 and 67 being provided to cause all the pinions or gear wheels to rotate in the same direction. By providing the gear wheels or pinions on the ends of the guide rollers, as well as on the drums which directly carry the web, I positively rotate the guide rollers and, consequently, relieve the web of all strain which would be put upon it if it was required to frictionally rotate the guide rollers. It will be noted that the web unwinds from the drum 45 outwardly from the rear thereof and winds onto the drum 46 below the same and from the front so that the direction of rotation is the same with both drums. The pinion 62 is loose on the shaft of the rear roller 53 and has a pawl 62ª pivoted on its inner face to engage a ratchet 62ᵇ on the said shaft. When the web is traveling forward, the pinion 62 will be inactive and will slip past the ratchet but when the direction of movement of the web is reversed to reset the same, the pawl will engage the ratchet so that the roller will be positively actuated.

On the upper end of the shaft 23, I mount a collar or clutch member 68 having a notched or ratcheted upper edge which is adapted to engage a similar notched or ratcheted edge at the lower end of a hub 69 of a beveled gear 70, the lower end of said hub fitting over the upper end of the shaft 23 so as to be engaged by the said clutch member 68 whereby the motion of the shaft 23 will be imparted to the said beveled gear which meshes with a beveled gear 71 on that end of the forward roller 53 which is remote from the gear wheel 61. The motion of the main shaft 12 will be transmitted through the shaft 20, the shaft 23, and the gearing just described to the gear 71 so as to rotate the roller 53 and thereby actuate the train of gearing shown in Fig. 6 and effect travel of the web 44. The clutch member 68 is slidably fitted on the upper end of the shaft 23 and is carried by a pin 72 passing through the notches 73 in the upper end of the shaft, the clutch member 68 being held normally in engagement with the clutch hub 69 by a spring 74 coiled around the shaft 23 between the clutch member and a stop or collar 75 secured to the shaft. The upper end of the shaft 23 is constructed with an axial bore or socket 76 which receives the lower end of a spindle 77 extending upwardly through the clutch hub 69 and gear wheel 70 and through a sleeve or guide 78 above the said gear wheel. The upper end of this spindle projects through the top of the casing and is equipped with a milled-head 79. The spindle is also provided in its upper portion with a series of annular grooves 80 which are adapted to be engaged by a holding spring 81 secured upon the under side of the top of the casing so that the spindle will be held in its adjusted position. The sleeve or guide 78 is provided with a groove 82 to receive a key 83 on the spindle 77 and the gear wheel 70 is constructed with a socket 84 in which the said key may seat. The lower end of the spindle will rest upon the pin 72, as clearly shown in Fig. 8. Ordinarily the clutch member 68 is in engagement with the clutch hub 69 so that the web or road indicator will be caused to travel in synchronism with the travel of the vehicle and the spindle 77 will be in its uppermost position so that it will be inactive. The groove 82 extends entirely around the bore of the collar or guide 78 and, consequently, when the spindle 77 is in its uppermost position it may be rotated without transmitting motion to any of the parts. The vehicle may, consequently, be left unoccupied without any liability of the map being tampered with so that its adjustment will not be disturbed and access to the map through the top of the casing may be prevented by applying any convenient form of lock to the door 2, as will be readily understood.

When it is desired to reset the map, a downward pressure is exerted upon the spindle 77 which will release the clutch member 68 from its engagement with the clutch hub 69 by reason of the engagement of the lower end of the spindle with the pin 72 extending diametrically through and carrying the clutch member. This downward movement, if continued, will carry the key 83 into engagement with the socket 84 and if the spindle be then rotated, by means of the milled head 79, the beveled gear 70 will be also rotated and the map may then be easily reset.

It is thought the operation and advantages of my improved apparatus will be readily understood from the foregoing description, taken in connection with the accompanying drawings. The several parts of the apparatus are very compactly arranged so that the registering mechanisms and the indicator are brought within a small compass and may be easily viewed by the traveler at any time. The travel of the map will, of course, be determined by the travel of the machine and the point where the machine happens to be will be accurately indicated by the pointer 8 at all times. Inasmuch as the forward guide or measuring roller and the web-carrying drums are positively operated, stretching of the web is avoided and, consequently, the indicator will retain its accuracy throughout its life. The spindle 77 furnishes a very simple and ready means for quickly resetting the map at the end of a trip or for adjusting the same at an intermediate point of the journey if it should be desired to return to a point which has been passed. Moreover, when the map is reset by means of this spindle, the odometer and speedometer will remain inoperative. It is also possible by means of this device to retravel a portion of the road without causing the travel of the map, inasmuch as it is merely necessary to depress the spindle sufficiently to disengage the clutch member 68 from the clutch hub 69 whereupon the travel of the machine will operate the speedometer and odometer without affecting the map. When the point at which the travel of the map was arrested has been again reached, the spindle may be permitted to return to its upper position thereby permitting the clutch member 68 to reëngage the clutch hub 69 whereupon the further travel of the machine will actuate the map. It will be readily noted that the map and other parts may be withdrawn bodily from the main casing or housing without affecting the speedometer or odometer. If the map or road indication be printed in reverse order upon the opposite sides of the web, the device may be arranged for the return trip in an exceedingly short period of time. The plates 47 are lifted from the guides 49, the stub shafts engaging the drums 45 and 46 are withdrawn to release the drums, the positions of said drums exchanged, the stub-shafts again engaged therein, and the carrier then returned to its engagement with the guides 49.

Having thus described the invention, what is claimed as new is:

1. In an apparatus for the purpose set forth, the combination of a casing, a carrier disposed within the casing, rollers within the carrier, an exhibitor carried by said rollers, arms pivotally mounted within the casing at the sides of the carrier, means on said arms for engaging the exhibitor to hold it against some of the said rollers, yieldable means tending to swing said arms upwardly, and means for limiting the movement of said arms in both directions.

2. In an apparatus for the purpose set forth, the combination of a casing, an exhibitor mounted therein, a main shaft disposed within the casing, a second shaft driven from the main shaft and having one end provided with a socket and with longitudinal notches, a clutch member slidably mounted on said end of said second shaft, a pin extending through said clutch member and through the notches and socket in the end of the shaft, a gear wheel having a clutch hub fitting over the end of the shaft and adapted to be engaged by said clutch member, said gear wheel being disposed to actuate the exhibitor, a guide between the casing and said gear wheel, and a spindle slidably and rotatably mounted in said guide and constructed to engage the gear wheel and release the clutch member from the clutch hub upon said gear wheel.

3. In an apparatus for the purpose set forth, the combination of a casing, a carrier removably fitted in the casing, rollers within the carrier, an exhibitor carried by said rollers, arms pivotally mounted in the casing at the sides of the carrier, said arms being provided with stops respectively above and below their pivots to engage the casing and limit the upward and downward movement of the arms, means on said arms to engage the exhibitor and hold it against some of the rollers, and yieldable means acting on the arms to move them toward the exhibitor.

In testimony whereof I affix my signature.

GEORGE A. DEARDORFF. [L. S.]